(12) United States Patent
Gunderson

(10) Patent No.: US 8,186,698 B2
(45) Date of Patent: May 29, 2012

(54) TRICYCLE

(76) Inventor: Mark E. Gunderson, Cedar City, UT (US)

(*) Notice: Subject to any disclaimer, the term of this patent is extended or adjusted under 35 U.S.C. 154(b) by 41 days.

(21) Appl. No.: 12/913,110

(22) Filed: Oct. 27, 2010

(65) Prior Publication Data

US 2012/0104722 A1 May 3, 2012

(51) Int. Cl.
*B62M 9/04* (2006.01)
(52) U.S. Cl. .............. 280/210; 280/282; 280/62
(58) Field of Classification Search .......... 280/210, 280/282, 62, 259, 230, 260, 261
See application file for complete search history.

(56) References Cited

U.S. PATENT DOCUMENTS

| | | | | |
|---|---|---|---|---|
| 279,356 | A * | 6/1883 | Denton | 280/255 |
| 573,285 | A | 12/1896 | PFautz | |
| 2,808,705 | A | 10/1957 | Ingres | |
| 3,592,487 | A * | 7/1971 | Mansperger | 280/261 |
| 3,834,721 | A * | 9/1974 | Gobby | 280/7.15 |
| 3,913,946 | A * | 10/1975 | Valentine et al. | 280/236 |
| 3,995,875 | A | 12/1976 | Wada | |
| 4,159,752 | A | 7/1979 | Kanno | |
| 4,541,501 | A | 9/1985 | Kawasaki | |
| 4,789,174 | A | 12/1988 | Lawwill | |
| 4,826,190 | A * | 5/1989 | Hartmann | 280/236 |
| 4,966,381 | A * | 10/1990 | Feikema | 280/261 |
| 4,997,197 | A | 3/1991 | Shultz | |
| 5,284,355 | A * | 2/1994 | Ishii | 280/287 |
| 5,685,553 | A | 11/1997 | Wilcox et al. | |
| 5,863,058 | A | 1/1999 | Jinks | |
| 5,941,548 | A | 8/1999 | Owsen | |
| 6,139,039 | A | 10/2000 | Becker | |
| 6,182,991 | B1 | 2/2001 | Christini et al. | |
| 6,279,631 | B1 | 8/2001 | Tuggle | |
| 6,283,487 | B1 | 9/2001 | Torre | |
| 6,367,824 | B1 | 4/2002 | Hayashi | |
| 6,446,985 | B1 | 9/2002 | Tompsett | |
| 6,601,862 | B2 | 8/2003 | Kettler | |
| 6,817,617 | B2 | 11/2004 | Hayashi | |
| 6,953,203 | B2 | 10/2005 | Wilcox et al. | |
| 7,100,929 | B2 * | 9/2006 | Shapiro et al. | 280/282 |
| 2007/0040350 | A1 | 2/2007 | Wiswell et al. | |
| 2010/0331149 | A1 * | 12/2010 | Turner | 482/57 |

* cited by examiner

*Primary Examiner* — Tashiana Adams
(74) *Attorney, Agent, or Firm* — Webb IP Law Group; Jason P. Webb; Danny y. H. Cheng

(57) ABSTRACT

A tricycle includes a frame and a front wheel. The tricycle includes a first rear wheel coupled to the frame. The tricycle includes a second rear wheel coupled to the frame. The tricycle includes a front suspension system and a rear suspension system functionally coupled to the frame. The tricycle includes a drive system coupled to the frame and a wheel hub fixedly coupled to the first drive shaft. The drive system includes a transmission system coupling a first drive train to a second drive train. The tricycle includes a locking device configured to lock the relative position of the wheel hub and the rear axle, wherein the locking device is selectably adjustably between a first mode and a second mode. The first mode includes the wheel hub and the rear axle locked together, and the second mode includes the wheel hub and the rear axle shaft independently rotatable.

15 Claims, 9 Drawing Sheets

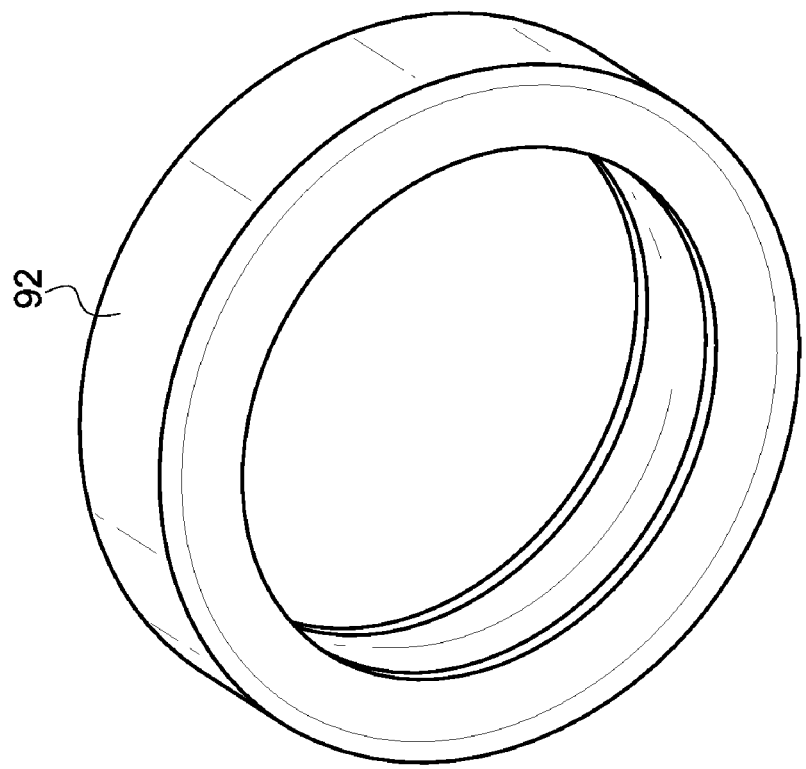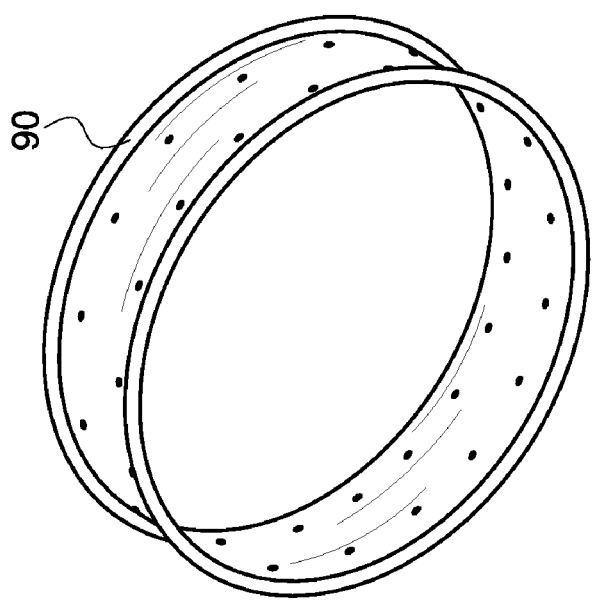
Fig. 5

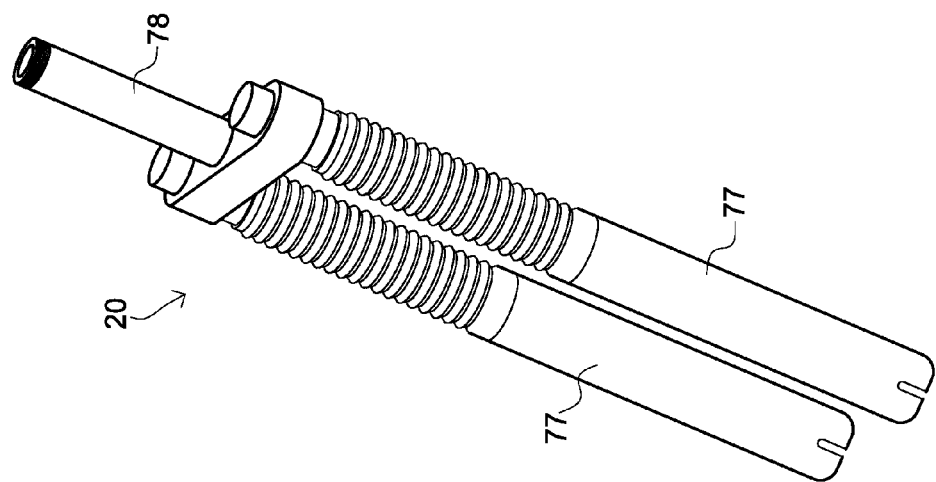
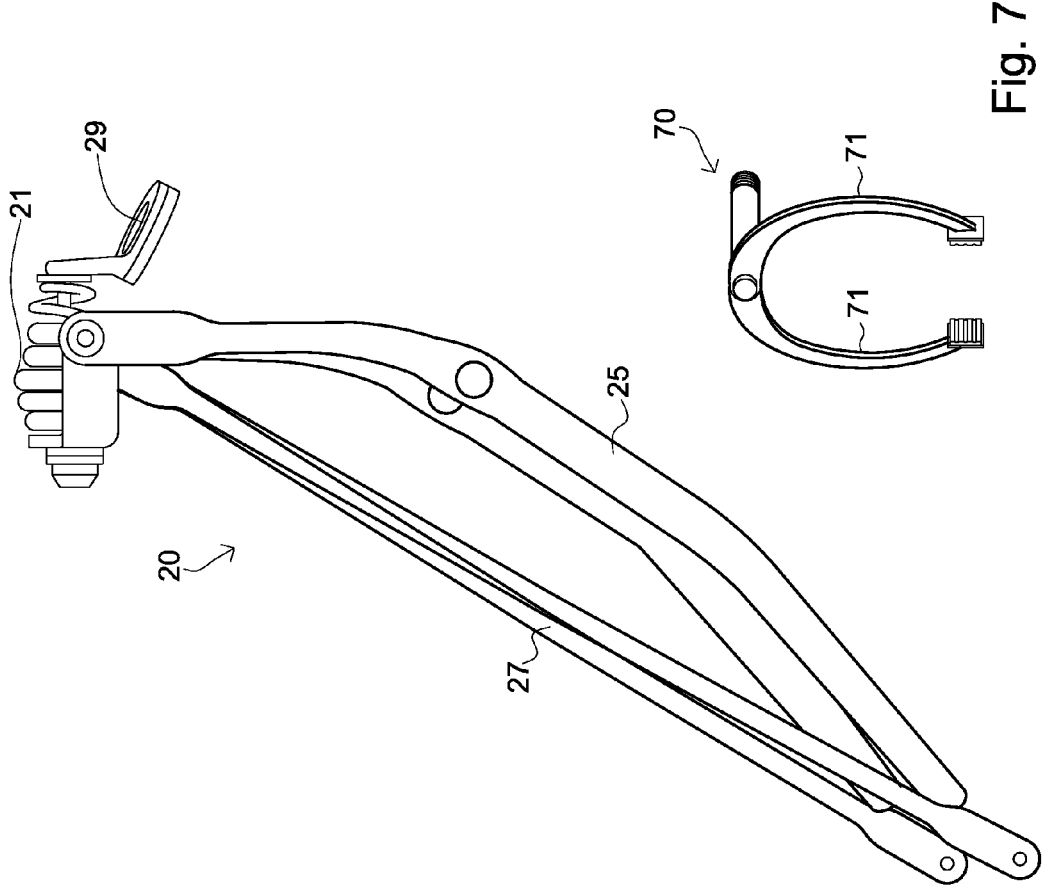
Fig. 7

TRICYCLE

BACKGROUND OF THE INVENTION

1. Field of the Invention

The present invention relates to vehicles, specifically to an all terrain tricycle.

2. Description of the Related Art

A tricycle, sometimes abbreviated to a trike, is a three-wheeled vehicle. While tricycles are often associated with the small three-wheeled vehicles used by pre-school age children, they are also used by adults for a variety of purposes. Adult-sized tricycles are used primarily by older persons for recreation, shopping, and exercise. In addition, tricycles are used primarily for commercial transportation, either of passengers in pedicabs, or of freight and deliveries. Some improvements have been made in the field. Examples of references related to the present invention are described below in their own words, and the supporting teachings of each reference are incorporated by reference herein:

U.S. Pat. No. 6,601,862, issued to Kettler, discloses a tricycle and intermediate frame for tricycle. The tricycle includes a rear axle, rear wheels coupled to free ends of the rear axle, a rear seat, and a rear frame coupled to the rear axle and to the rear seat. A front frame includes a fork tube, and the front frame and the rear frame are detachably connectable to each other. The tricycle also includes a handlebar, and a fork coupled to the handle bar. The fork is rotatably coupled to the fork tube. A front wheel includes pedal cranks and is rotatably coupled to the fork. A second seat and a holding element are also included. The intermediate frame is arranged to support the second seat and the holding element, and is detachably coupled between the front frame and the rear frame.

U.S. Pat. No. 5,863,058, issued to Jinks, discloses an adult tricycle is provided comprised of a standard conventional adult tricycle and a double occupancy child seat connected with the operator's portion of the vehicle. In this configuration a child or children would be able to sit in a safe environment behind the operator's seat. The child's seat includes a padded seat with seat belts, and an enclosed front, sides, and back, in order to prevent accidental entanglement between the passengers and any of the moving parts. With the seating area being part of the operator portion of the tricycle, as opposed to a trailer-style, the tricycle achieves much greater stability and security for both operator and passengers.

U.S. Pat. No. 4,966,381, issued to Feikema, discloses a tricycle including a generally horizontal perimeter frame supported above the ground by a pair of rear wheels and a steerable front wheel. The perimeter frame is continuous along one side and front and back while having an opening in the opposite side just ahead of the rear wheel serving as a pass-thru for ease of entry and egress with regard to a seat positioned generally between the rear wheels. An openable gate may be provided which fits into the opening and renders this side of the frame continuous. The device is propelled by foot rotation of a forwardly positioned foot crank which is held for rotation along a generally horizontal axis between the sides of the frame. A chain gear is connected at one end of the foot crank which driveably engages an endless chain positioned in elongated fashion along one side of the frame. The chain then driveably engages a second chain gear connected to one rear wheel. The coasting feature is accomplished in the preferred embodiment by a one-way free wheel hub disposed between the foot crank chain gear and the foot crank end whereby the chain is always in motion whenever the rear wheels are rotating, although the free-wheel hub may also be connected to one rear wheel instead.

U.S. Pat. No. 3,834,721, issued to Gobby, discloses a twin chain drive mechanism for the propulsion of a pair of separated, aligned axle shafts and their attached rear road wheels of a tricycle at various speeds by the manipulation of its pedals, each independent axle shaft having a free-wheeling drive sprocket removably attached thereto which allows for coasting and the variable speeds of the wheels required during operation.

U.S. Pat. No. 6,446,985, issued to Tompsett, discloses an improved two-wheel-drive bicycle having, in certain preferred forms, a chain-driven front-drive mechanism having a gearing arrangement attached to the fork assembly, whereby the gear arrangement, using fixed-axis and variable-axis turning members, transfers rotational power from the drive mechanism along and around the steering axis to the front sprocket. Certain preferred embodiments include particular gearing arrangements and particular ways of getting bicycle power to the fixed-axis turning members.

The inventions heretofore known suffer from a number of disadvantages which include being limited in application, being limited in adaptability, being limited in mobility, being expensive, being difficult to use, being difficult to maintain, failing to adapt to differing riding conditions, and/or being limited in use.

What is needed is a tricycle that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available tricycles. Accordingly, the present invention has been developed to provide a multi-terrain and multi-functional tricycle.

According to one embodiment of the invention, there is a tricycle which may include a frame. The tricycle may include a front wheel coupled to the frame and includes a front rim and a front tire coupled about the front rim. The tricycle may include a first rear wheel coupled to the frame. The first rear wheel may include a first rear rim and a first rear tire, wherein the first rear tire is wider than the front tire. The tricycle may include a second rear wheel coupled to the frame, wherein the second rear wheel includes a second rear rim and a second rear tire, wherein the second rear tire is wider than the front tire. The first rear wheel and the second rear wheel may further include off road tires configured to provide traction for off road all-terrain use.

The tricycle may include a front suspension system functionally coupled between the frame and the front wheel; wherein the front suspension system further includes a front fork shock suspension. The tricycle may include a rear suspension system functionally coupled between the frame and the first and second rear wheels. The rear suspension system may further include a suspension seat post coupled between the frame and the seat. The tricycle may include a drive system coupled to the frame and including a wheel hub substantially between the first rear wheel and the second rear wheel; wherein the drive system may further include a transmission system configured to provide gear ratios having a one to one gear ratio when in a second gear. The tricycle may include a locking device configured to lock the relative position of the wheel hub and the rear axle, wherein the locking device is selectably adjustably between a first mode and a second mode, wherein in the first mode the wheel hub and the rear axle are locked together, and wherein in the second mode the drivehub and the rear axle are independently rotatable. The locking device may further include a locking pin configured to lock the wheel hub and the rear axle to the second drive shaft.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which:

FIG. 5 is a perspective view of a rear tire and a rear rim of a tricycle, according to one embodiment of the invention;

FIG. 7 is a perspective view of a plurality of different front fork suspension systems and a brake caliper of a tricycle, according to one embodiment of the invention;

DETAILED DESCRIPTION OF THE INVENTION

Figure 1:
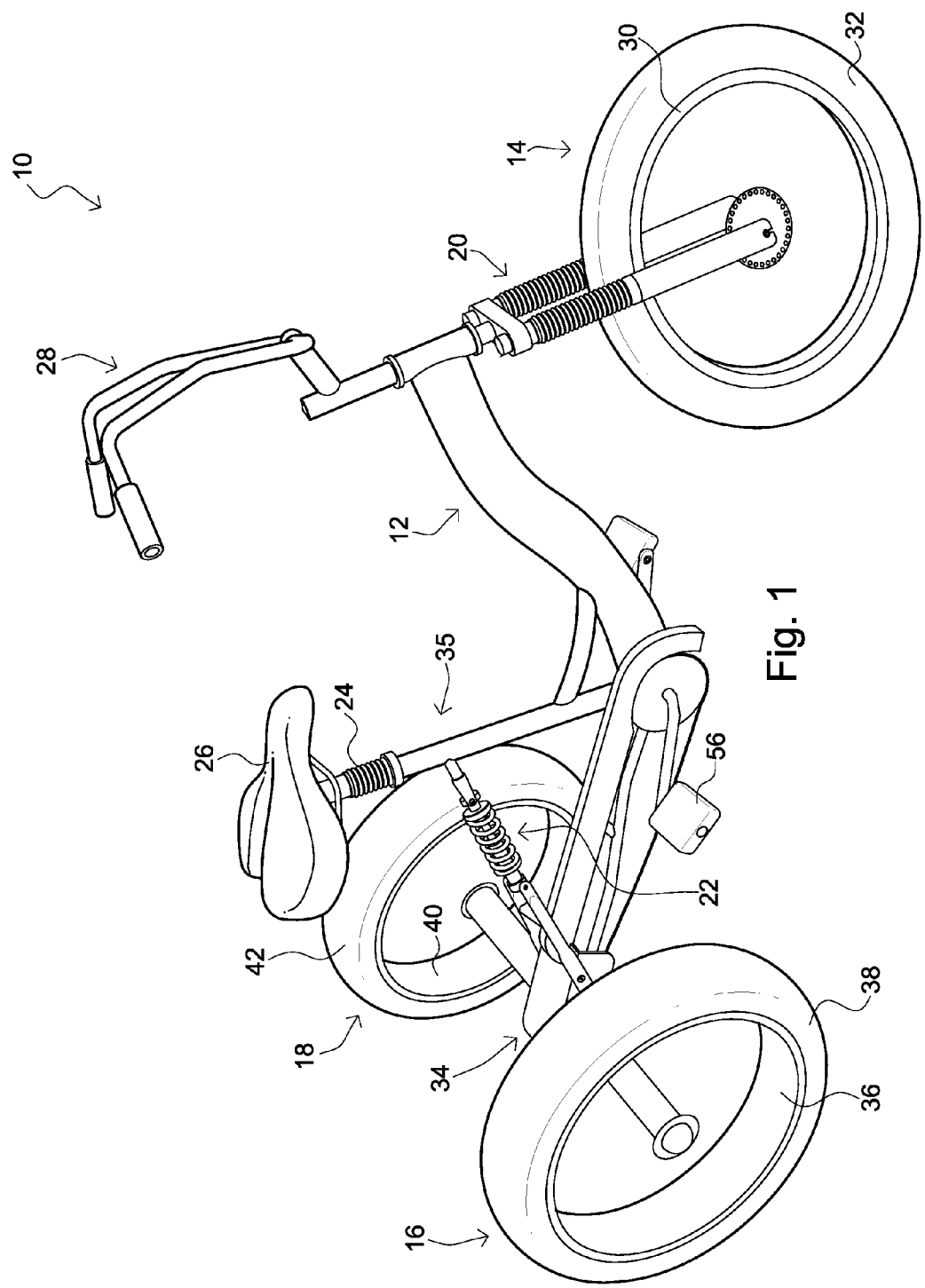
FIG. 1 is a perspective view of a tricycle, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 is a perspective view of a tricycle, according to one embodiment of the invention. There is shown a tricycle 10 including a frame 12. The illustrated tricycle 10 includes a front wheel 14, a first rear wheel 16, and a second rear wheel 18 coupled to the frame 12. The tricycle 10 includes a front fork shock suspension 20 coupled to the frame 12 and a built-in shock absorber 22 disposed within the frame 12. The illustrated frame 12 includes a suspension seat post 24 coupled between the frame 12 and a seat 26. The tricycle 10 includes a drive system 34 coupled to the frame 12 between the first rear wheel 16 and the second rear wheel 18. The tricycle also includes a pair of handle bars 28 and a pair of foot pedals 56.

The illustrated front wheel 14 includes a front rim 30 and a front tire 32 coupled about the front rim 30. The illustrated front wheel 14 is coupled to the front fork shock suspension 20. The illustrated front fork shock suspension 20 extends through the frame 12 and couples to a pair of handle bars 28, disposed opposite of the front wheel 14. The illustrated first rear wheel 16 includes a first rear rim 36 and a first rear tire 38. The illustrated second rear rim 38 includes a second rear rim 40 and a second rear tire 42.

The illustrated first rear tire 38 and the second tire 42 are wider than the front tire 32. In one embodiment, the rear tires are four inches wide and the front tire is three inches wide. In another embodiment, the rear tires are at least about twice as wide as the front tire (+−5%). In still another embodiment, the rear tires are four inches wide and the front tire is three inches wide. In still yet another embodiment, the rear tires are at least about 15%, 25%, 30%, 33%, or 50% wider than the front tire. The first rear wheel 16 and the second rear wheel 18 may include off road tires configured to provide traction for off-road and all-terrain use.

The illustrated tricycle 10 includes a rear suspension system 35 functionally coupled between the frame 12 and the first rear wheel 16 and second rear wheel 18. The illustrated rear suspension system 35 includes a suspension seat post 24 coupled between the frame 12 and the seat 26; and a built-in shock absorber 22 coupled within the frame 12 of the tricycle 10. The illustrated built-in shock absorber 22 is configured to reduce vibration from the rear wheels 16, 18.

The illustrated drive system 34 is configured to provide varying gear ratios to adjust the rate of revolution of the rear wheels 16, 18. The gear ratios may vary from a high rate of revolution per revolution of the pedals to a low rate of revolution per revolution of the pedals. The drive system 34 is also configured to provide dual rear wheel drive. The drive system includes a first mode configured to provide a single rear wheel drive; and a second mode configured to provide a dual rear wheel drive. The dual rear wheel drive provides additional traction and a higher rate of speed for the tricycle 10.

The following are non-limiting examples of shock absorbers and/or portions thereof: a non-limiting example of a front fork suspension may be a Magura Durin Suspension Fork manufactured by Magura Bike Parts GmbH and Co. KG, Heinrich Kahn Strasse 24, 89150, Laichingen, Germany; a non-limiting example of a suspension seat post may be a Cane Creek Thudbuster ST suspension mountain seat post manufactured by Can Creek, 355 Cane Creek Road, Fletcher, N.C., 28732; a non-limiting example of a front fork suspension, a rear seat post, or a rear suspension system may be a Rock Shox fork, a Rock Shox seat post, a Rock Shox rear suspension manufactured by SRAM, LLC, 1333 North Kingsbury 4th Floor, Chicago, Ill., 60642.

The following are non-limiting examples of suspension systems and/or portions thereof: a non-limiting example a suspension may be a suspension system as taught in U.S. Publication Number 2010/0007113, by Earle et al.; a non-limiting example of a suspension may include one or all of the following components: a front fork suspension, a rear seat post, or a rear suspension system may be a Rock Shox fork, a Rock Shox seat post, a Rock Shox rear suspension manufactured by SRAM, LLC, 1333 North Kingsbury 4th Floor, Chicago, Ill., 60642.

The following are non-limiting examples of drive systems and/or portions thereof: a non-limiting example of a drive system may be a Gates Carbon Drive System manufactured by CD Enterprises, 801 Brickyard Circle, Golden, Colo., 880403; a SRAM Drive Train System manufactured by SRAM, LLC, 1333 North Kingsbury 4th Floor, Chicago, Ill., 60642; a Shimano XTR Drive Train manufactured by Shimano American Corp. One Holland, Irvine, Calif., 92618.

Figure 2:
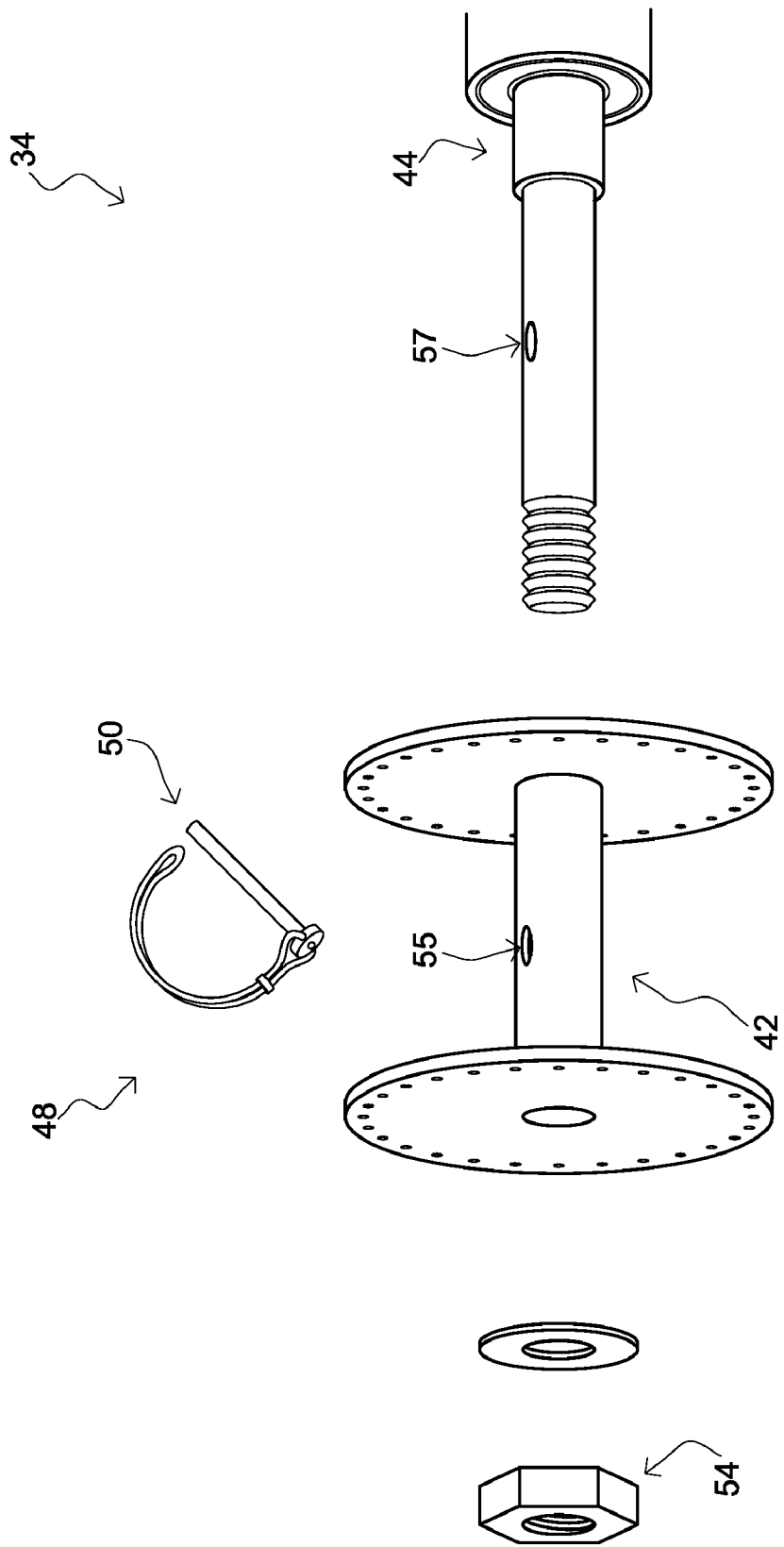
FIG. 2 is an exploded view of a drive system of a tricycle, according to one embodiment of the invention.

FIG. 2 is an exploded view of a drive system of a tricycle, according to one embodiment of the invention. There is shown a drive system 34 of a tricycle disposed between a first rear wheel and a second rear wheel. The illustrated drive system 34 includes a wheel hub 42. The illustrated wheel hub 42 is coupled to a rear axle 44, wherein the rear axle 44 is coupled to a frame of a tricycle by a coupling member 54.

The illustrated drive system 34 includes a wheel hub 42 disposed substantially between the first rear wheel and the second rear wheel and fixedly coupled to a rear axle 44. The wheel hub 42 is coupled to a second drive shaft which is coupled to a transmission system of the drive system 34. The transmission system is coupled to a pair of pedals through a first drive shaft and configured to propel the tricycle forward. The illustrated wheel hub 42 is selectably coupleable to the rear axle 44 and configured to provide dual real wheel drive capabilities.

The illustrated drive system 34 includes a locking device 48 configured to lock the relative position of the wheel hub 42 to the rear axle 44, thereby engaging both rear wheels. In particular, there is a pin with a clasp sized to permit the pin to be disposed through matching apertures in the wheel hub and rear axle such that when the pin is in place, the hub and rear axle are rotationally locked together. The clasp of the pin helps prevent the pin from spontaneously disengaging from the drive system. The locking device 48 is selectably adjustably between a first mode and a second mode, wherein in the first mode: the wheel hub 42 and the rear axle 44 are locked together, and wherein in the second mode the wheel hub 42 and the rear axle 44 are independently rotatable. In the first mode the left rear wheel and the right rear wheel rotate simultaneously to each other; and in a second mode the left rear wheel rotates independently from the right rear wheel.

The independent rotation when the locking device is disengaged provides the tricycle with a single wheel drive, wherein one of the rear tires, typically the left rear wheel, moves independent to the right rear wheel. The locking device 48 includes a locking pin 50 configured to lock the wheel hub 42 to the rear axle 44 and to the left rear wheel. The locking pin 50 is configured to fit into a first locking aperture 55 of the wheel hub 42 and into a second locking aperture 57 of the rear axle 44. The locking pin 50 includes an attachment member 57 disposed on a first end of the locking pin 50 and configured to wrap around the wheel hub 42 and selectably secure about a second end of the locking pin 50, opposite of the first end.

In operation of one embodiment of the invention, in a single rear wheel drive, a user pedals and rotates the first drive shaft thereby rotating the transmission system. The rotation of the transmission system in turn rotates a wheel hub of the drive train. The rotation of the wheel hub in a single rear wheel drive only rotates the right rear wheel of the tricycle, leaving the left rear wheel to rotate independently of the right rear wheel. In a dual rear wheel drive the user couples the locking device through the aperture of both the wheel hub and the rear axle, thereby engaging the left rear wheel to move simultaneously along with the right rear wheel during operation.

In one embodiment of the invention, a locking device may include one or more of the following: mating portions movably coupled to one or more of the drive shaft and wheel hub, a control device configured to toggle the locking device between engage/disengage modes, securing device configured to prevent the spontaneous disengagement of the locking device, and a shape altering device configured to alter a shape of one or more of the wheel hub and drive shaft such that in a first mode the corresponding shapes permit independent rotation and in a second mode the shapes do not permit independent rotation.

In operation of one embodiment of the invention, there is a tricycle in a second mode, wherein the left rear wheel moves independently from the right rear wheel, thereby having a single rear wheel drive. The user disposes the locking pin through a first locking aperture of the wheel hub and through the second locking aperture of the rear axle and wraps the attachment member around the wheel hub, and couples the attachment member to an opposite end of the locking pin; thereby engaging the rear axle and the rear left wheel; thereby transitioning from the second mode to a first mode. In the first mode both rear wheels are engaged and moving, providing dual rear wheel drive. The user may disengage the dual rear wheel drive by removing the attachment member and the locking pin from the wheel hub and the rear axle.

Figure 3:
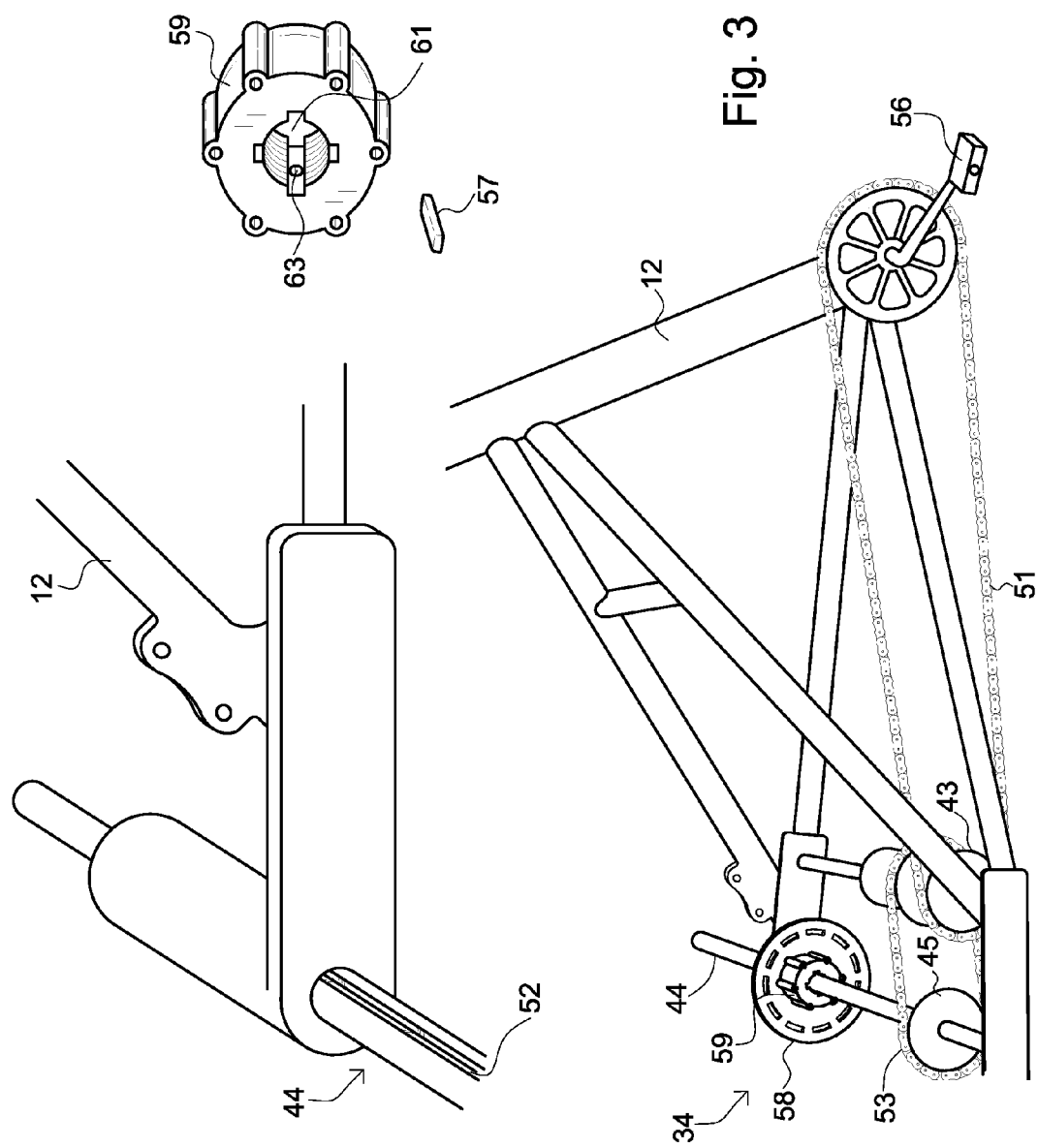
FIG. 3 is a perspective view of a frame and a drive system of a tricycle including a close-up perspective view of a rear axle and frame and a side perspective view of a brake hub, according to one embodiment of the invention.

FIG. 3 is a perspective view of a frame and a drive system of a tricycle including a close-up perspective view of a rear axle and frame and a side perspective view of a brake hub, according to one embodiment of the invention. There is shown a drive system 34 coupled to a frame 12 of a tricycle. The illustrated drive system includes a first drive train 51 coupling a pair of pedals 56 to a transmission system 43. The drive system 34 includes a second drive train 53 coupling the transmission system 43 to a wheel hub 45. The illustrated rear axle 44 includes a rear disc brake 58 coupled by a brake hub 59.

The illustrated pair of pedals 56 is configured to rotate the first drive train 51. The illustrated first drive train 51 is configured to rotate the transmission system 43 of the drive system 34. The transmission system 43 includes gear ratios having a one to one gear ratio when in a second gear. The rotation of the transmission system 43 rotates the wheel hub 45, thereby rotating the right rear wheel of the tricycle. The illustrated second drive train rotates a right rear wheel of the tricycle, thereby propelling the tricycle forward in a single rear wheel drive. The left rear wheel is configured to rotate independently from the right rear wheel in the single rear wheel drive. As illustrated in FIG. 3, the rear axle 44 includes a rear disc brake 58 coupled by a brake hub 59. The illustrated brake hub 59 includes a first aperture 61 configured to receive the rear axle 44. The brake hub includes a second aperture 63 configured to receive a locking mechanism is secure the brake hub 59 to the rear axle 44. The brake hub 59 includes a pin 57 configured to slide into a groove 52 of the rear axle and brake hub 59, thereby securing the rear disc brake 58 thereto.

Figure 4:
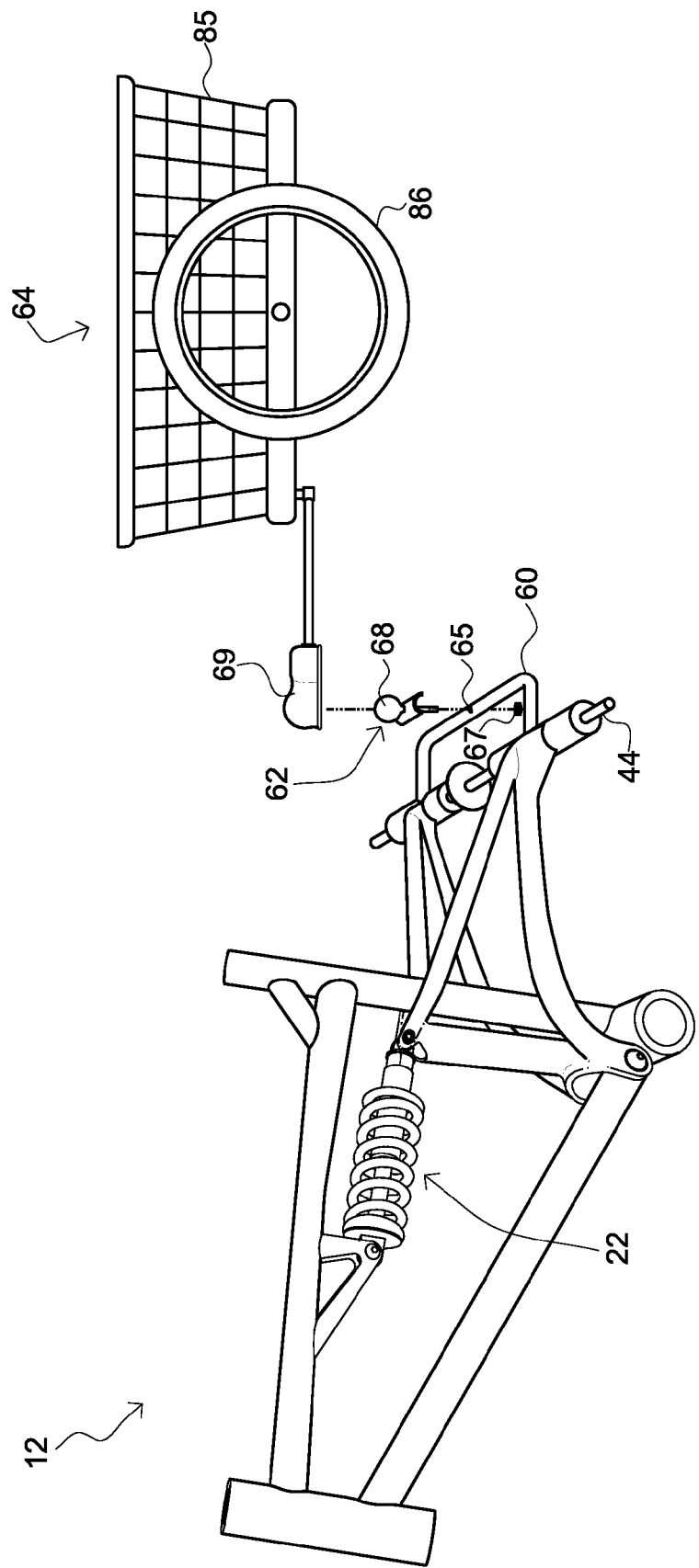
FIG. 4 is a perspective view of a frame of a tricycle and a towing attachment, according to one embodiment of the invention.

FIG. 4 is a perspective view of a frame of a tricycle, according to one embodiment of the invention. There is shown a tricycle frame 12 including a built-in shock absorber 22. The frame 12 includes an attachment bar 60 disposed behind the rear axle 44. The attachment bar 60 includes a towing attachment 62 configured to couple to a towing accessory 64.

The illustrated attachment bar 60 includes an aperture 65 configured to receive the towing attachment 62. The towing attachment 62 secures through the attachment bar and couples thereto by a coupling member 67. The illustrated towing attachment 62 is substantially disposed at a center of the attachment bar 60. The towing attachment 62 includes a towing ball 68 configured to receive an attachment member 69 of the towing accessory 64. The towing accessory 64 includes a carrying basket 85 and a pair of wheels 86. The towing accessory 64 is configured to be towed behind the tricycle and the carrying basket 85 is configured carry items.

FIG. 5 is a perspective view of a rear tire and a rear rim of a tricycle, according to one embodiment of the invention. There is shown a rear tire 92 and a rear rim 90; the illustrated rear tire 92 is coupled about the rear rim 90. The rear tire 92 is at least about twice as wide as the front tire of the tricycle to provide additional stability during off-road and all terrain travel. The rear tire 92 may include an all-terrain tire surface configured to provide stability and traction during off-road and all terrain travel.

Figure 6:
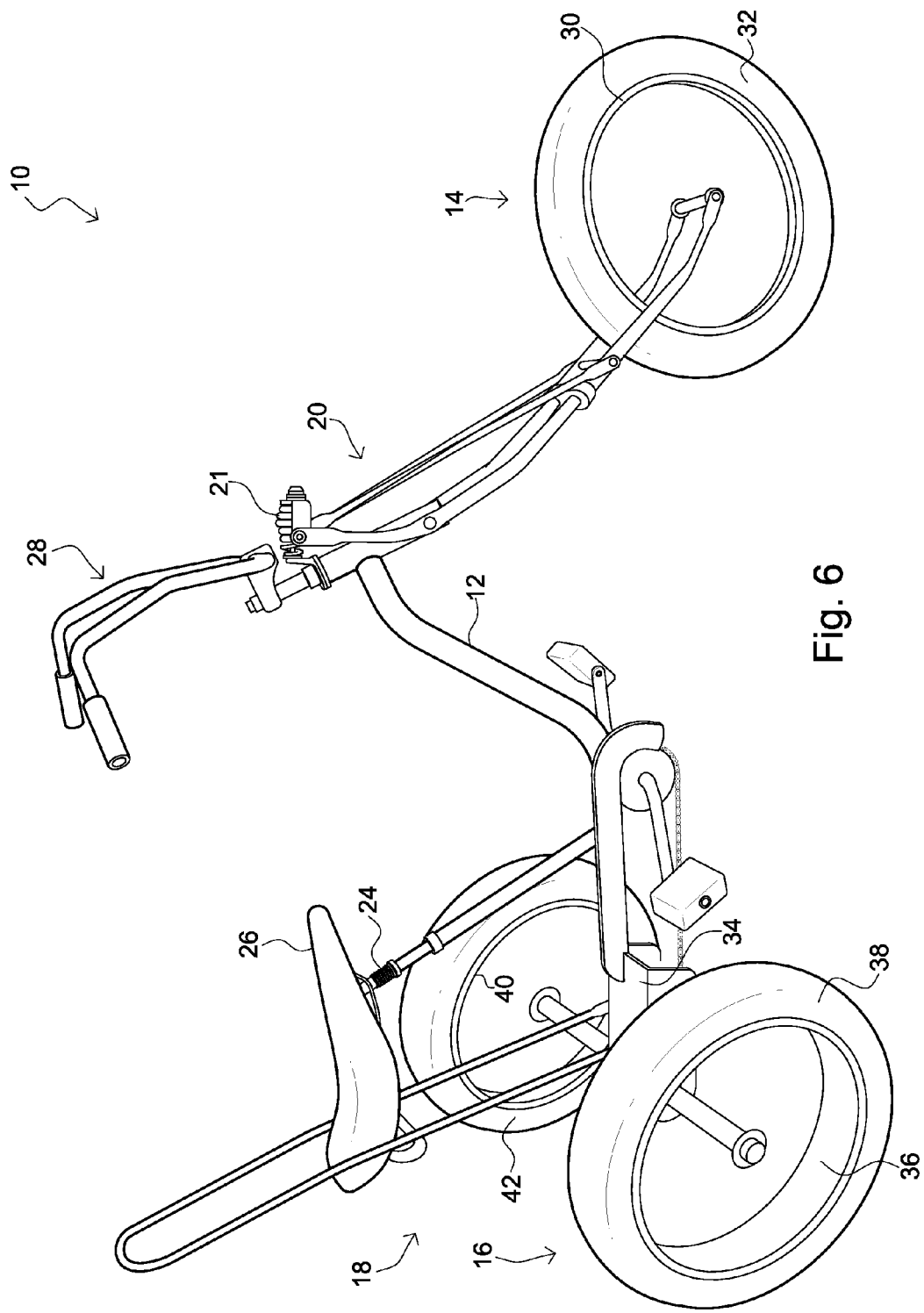
FIG. 6 is a perspective view of a tricycle, according to one embodiment of the invention.

FIG. 6 is a perspective view of a tricycle, according to one embodiment of the invention There is shown a tricycle 10 including a frame 12. The tricycle 10 includes a front wheel 14, a first rear wheel 16, and a second rear wheel 18 coupled to the frame 12. The tricycle 10 includes a front fork shock suspension 20 coupled to the frame 12. The frame 12 includes a suspension seat post 24 coupled between the frame 12 and a seat 26. The tricycle 10 includes a drive system 34 coupled to the frame 12 between the first rear wheel 16 and the second rear wheel 18.

The front wheel 14 includes a front rim 30 and a front tire 32 coupled about the front rim 30. The front wheel 14 is coupled to the front fork shock suspension 20. The front fork shock suspension 20 is coupled to the frame 12 and couples to a pair of handle bars 28, disposed opposite of the front wheel 14. The front fork suspension 20 includes a front spring shock 21 disposed on a top portion of the front fork suspension 20. The first rear wheel 16 includes a first rear rim 36 and a first rear tire 38. The second rear rim 38 includes a second rear rim 40 and a second rear tire 42. The first rear tire 38 and the second tire 42 are at least about twice as wide as the front tire 32.

The tricycle 10 includes a suspension seat post 24 coupled between the frame 12 and the seat 26. The suspension seat post 24 is configured to absorb vibration coming from the frame 12 and the rear wheels 16, 18. The drive system 34 is configured to provide varying gear ratios to adjust the rate of revolution of the rear wheels 16, 18. The drive system 34 is also configured to provide dual rear wheel drive. The drive system includes a first mode configured to provide a single rear wheel drive; and a second mode configured to provide a dual rear wheel drive. The dual rear wheel drive provides additional traction and a higher rate of speed for the tricycle 10.

As illustrated in FIG. 6, the tricycle may include a conversion kit configured to convert an older tricycle into a modern tricycle. The frame 12, the seat 26, and the pair of handle bars may be original, however the suspension system and the drive system 34 are modern. The suspension system includes a front fork suspension 20 and a front spring shock 21 configured to couple to the original frame 12 and to the original pair of handle bars 28. The suspension system also includes a suspension seat post 24 configured to couple in between the seat 26 and the frame 12.

Figure 8:
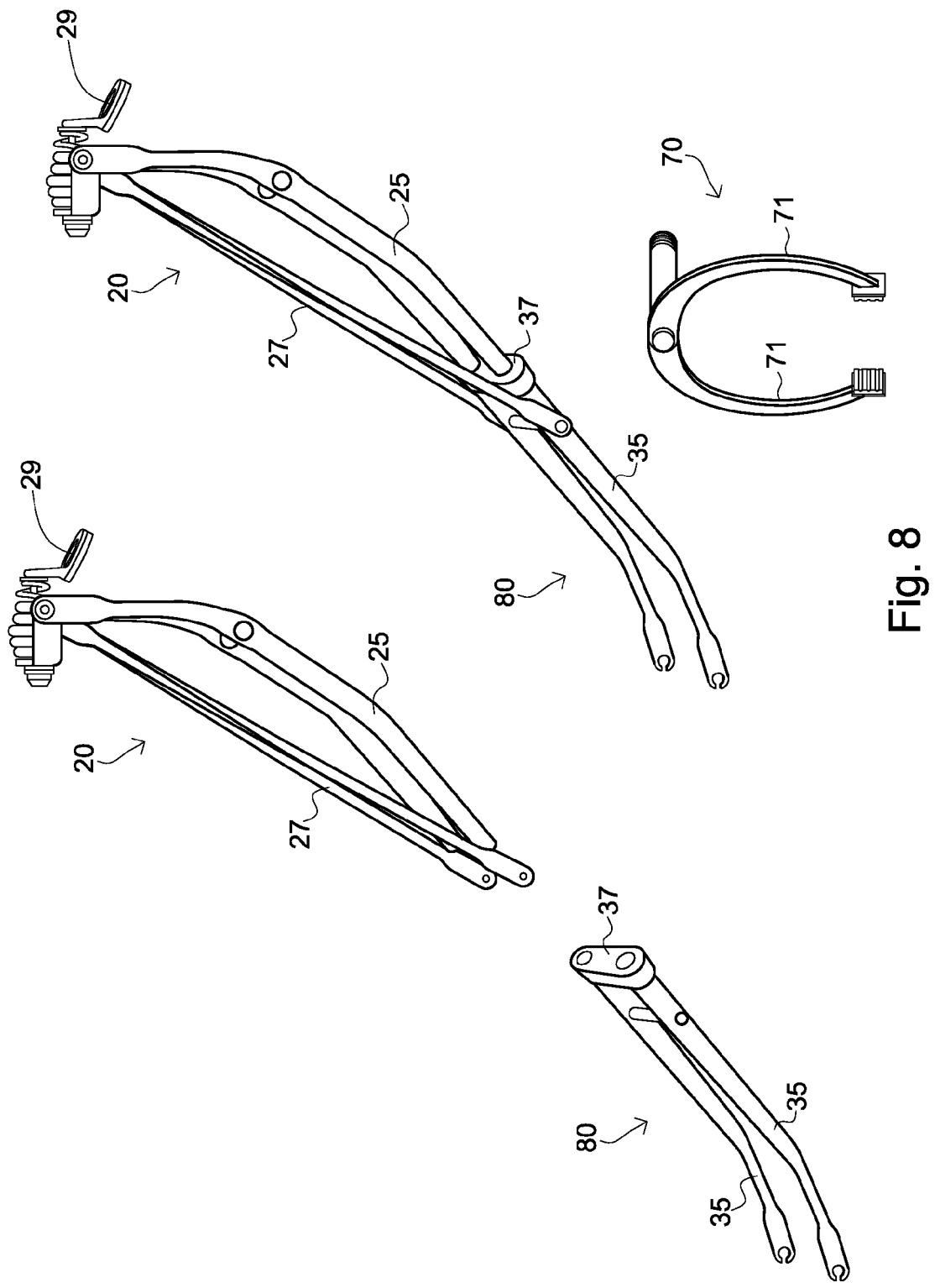
FIG. 8 is a perspective view of a plurality of front fork suspension systems, one in a partially exploded view, and a brake caliper of a tricycle, according to one embodiment of the invention.

FIGS. 7-8 show perspective views of a plurality of different front fork suspension systems and a brake caliper of a tricycle, according to one embodiment of the invention. There is shown a front fork suspension 20, a front fork extension 80, and a front brake caliper 70.

The illustrated front fork suspension 20 may include a pair of parallel shock absorbers 77 coupled to a post 78. The post 78 is configured to couple through a tricycle frame and couple to a pair of handle bars. The pair of parallel shock absorbers 77 are configured to couple a front wheel, thereby providing a front suspension for the tricycle.

The front fork suspension 20 may include a pair of parallel bottom suspension members 25 configured to couple to a front spring shock 21. The front fork suspension 20 may also include a pair of parallel top suspension members 27 configured to couple to the bottom suspension members 25 and to the front spring shock 21. The top and bottom suspension members 25, 27 may be coupled about the front spring shock 21 in substantially the same position. The front spring shock 21 is coupled to a coupling aperture 29 configured to couple through a frame of a tricycle. The top suspension members 27 are configured to couple to a front wheel of the tricycle.

As illustrated in FIG. 8, there is shown a front fork suspension 20 including a pair of parallel bottom suspension members 25 configured to couple to a front spring shock 21. The front fork suspension 20 includes a pair of parallel top suspension members 27 configured to couple to the bottom suspension members 25 and to the front spring shock 21. The front fork suspension 20 includes a front fork extension 80. The front fork suspension includes a pair of parallel support members 35 and a coupling bracket 37. The coupling bracket 37 is configured to receive and secure to the pair of parallel bottom suspension members 25. The top suspension members 27 are configured to couple to each of the support members 35. Each support member 35 is configured to couple to a front wheel of a tricycle.

The illustrated front brake caliper 70 includes a pair of brake arms 71 configured to couple about a front wheel. Each brake arm 71 is configured to engage the outer rim of the front wheel and providing friction to stop the front wheel from rotating. The front brake caliper 70 may be in communication with a handle lever disposed about a handle bar to activate each brake arm 71. The front brake caliper may be coupled to the front fork suspension or to a front fork extension 80.

Figure 9:
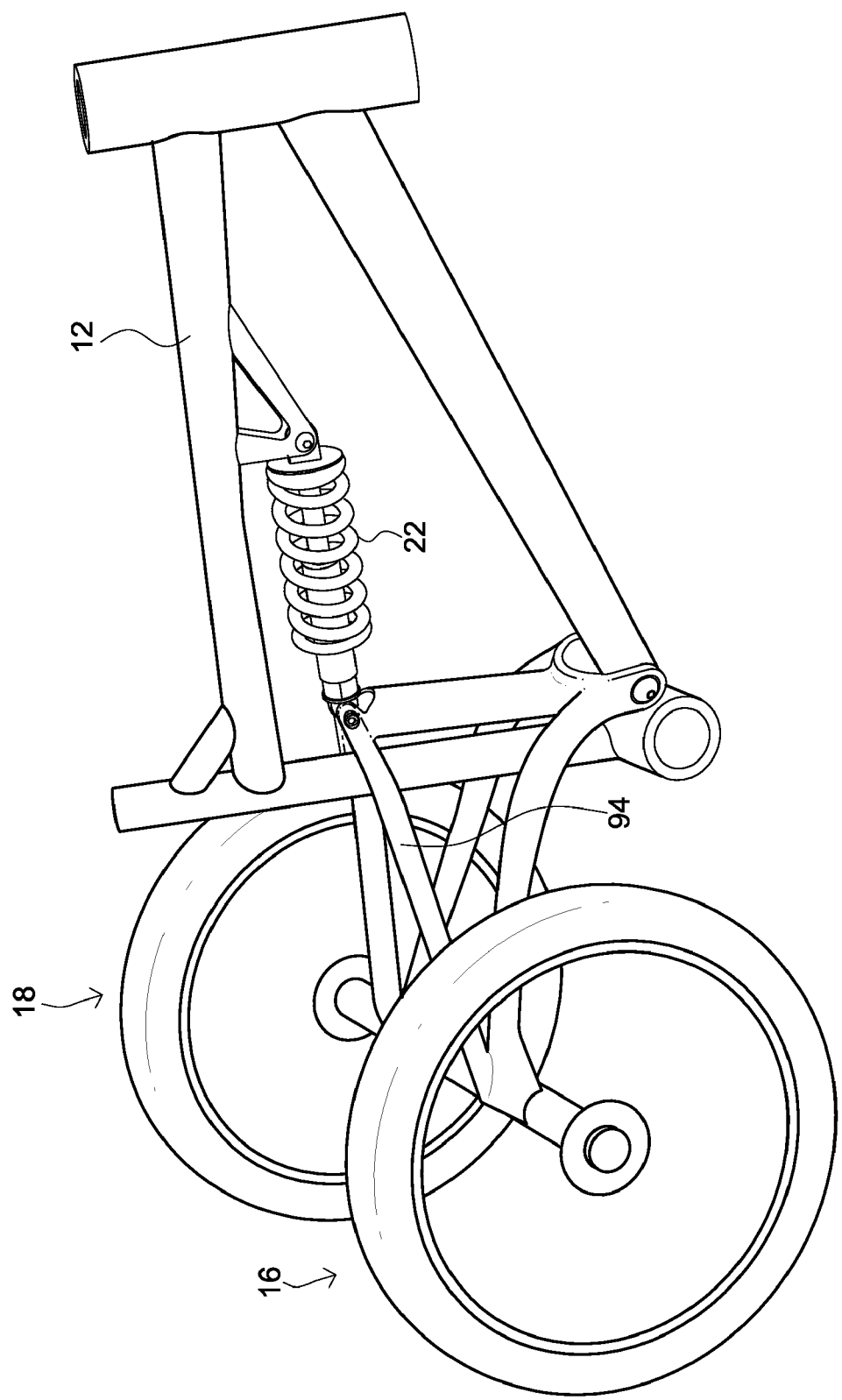
FIG. 9 is a perspective view of a single piece frame including a built-in shock absorber of a tricycle, according to one embodiment of the invention.

FIG. 9 is a perspective view of a frame including a built-in shock absorber of a tricycle, according to one embodiment of the invention. There is shown a single piece frame 12 including a built-in shock absorber 22. The illustrated built-in shock absorber 22 is disposed within the frame 12. The frame 12 includes a solid one piece frame design configured to support a built-in shock absorber 22. The single piece design is configured to limit weld spots and bolting of components together to create the frame of the tricycle. The built-in shock absorber 22 is coupled to a fork member 94, wherein the fork member 94 is coupled to each of the rear wheels 16, 18 of the tricycle. The shock absorber 22 is configured to reduce vibration from the rear wheels 16, 18 of the tricycle during operation.

In one embodiment of the invention, there is a tricycle including front and rear suspension devices, a drive shaft locking device configured to toggle the rear drive shaft between one and two wheel drive, and a width differential between front and rear tires. Accordingly, a tricycle may be adapted for multiple-uses (pavement, off-road, towing, recreation, and etc.) for a low cost and with simple maintenance.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures illustrate a locking device configured to engage the tricycle between a first mode and a second mode, one skilled in the art would appreciate that the locking device may be, but not limited to: a locking pin, a snap locking mechanism, a twist and lock locking mechanism, a magnetic locking mechanism, a twist and slide locking mechanism, a locking groove mechanism, a receiving member and a coupling member locking mechanism, etc. and still perform its intended function.

Additionally, although the figures illustrate a front tire and a pair of rear tires, one skilled in the art would appreciate that the front tire and the rear tires may be, but not limited to, all terrain tires, off-road tires, tires for use on sand, tires for use on rocky surfaces, hill climbing tires, trail use tires, rock climbing tires, street tires, farm use tires, military use tires, camping use tires, recreational tires, etc. and still perform its intended function.

It is expected that there could be numerous variations of the design of this invention. An example is that the particular shape of the frame may vary greatly and that acceptable frame shapes are plethoric.

Finally, it is envisioned that the components of the device may be constructed of a variety of materials, such as, but not limited to: metal, metal alloys, plastic, plastic composite, rubber, rubber composites, graphite, etc. and still perform its intended function.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A tricycle, comprising:
a) a frame;
b) a front wheel coupled to the frame and including a front rim and a front tire coupled about the front rim;
c) a first rear wheel coupled to the frame, wherein the first rear wheel includes a first rear rim and a first rear tire, wherein the first rear tire is wider than the front tire;
d) a second rear wheel coupled to the frame, wherein the second rear wheel includes a second rear rim and a second rear tire, wherein the second rear tire is wider than the front tire;
e) a front suspension system functionally coupled between the frame and the front wheel;
f) a rear suspension system functionally coupled between the frame and the first and second rear wheels;
g) a drive system coupled to the frame and including a wheel hub, a rear axle, and a transmission system disposed substantially between the first rear wheel and the second rear wheel; wherein the drive system includes a first drive train configured to rotate the transmission system; wherein the drive system further includes a second drive train in communication with the first drive train and configured to rotate the rear right wheel during operation in a single rear wheel drive; and
h) a locking device configured to lock the relative position of the wheel hub and the rear axle, wherein the locking device is selectably adjustably between a first mode and a second mode, wherein in the first mode the wheel hub and the rear axle are locked together, thereby rotating the right rear wheel and the left rear wheel simultaneously; and wherein in the second mode the wheel hub and the rear axle are independently rotatable, thereby rotating the right rear wheel and the left rear wheel independently of each other.

2. The tricycle of claim 1, wherein the locking device further includes a locking pin configured to lock the wheel hub and the rear axle, thereby rotating the right rear wheel and the left rear wheel together.

3. The tricycle of claim 1, wherein the first rear wheel and the second rear wheel further include off road tires configured to provide traction for off road all-terrain use.

4. The tricycle of claim 1, wherein the front suspension system further includes a front fork shock suspension.

5. The tricycle of claim 1, wherein the rear suspension system further includes a suspension seat post coupled between the frame and the seat.

6. The tricycle of claim 1, wherein the transmission system of the drive system further includes gear ratios having a one to one gear ratio when in a second gear.

7. A tricycle, comprising:
   a) a frame;
   b) a front wheel coupled to the frame and including a front rim and a front tire coupled about the front rim;
   c) a first rear wheel coupled to the frame, wherein the first rear wheel includes a first rear rim and a first rear tire, wherein the first rear tire is wider than the front tire;
   d) a second rear wheel coupled to the frame, wherein the second rear wheel includes a second rear rim and a second rear tire, wherein the second rear tire is wider than the front tire;
   e) a drive system coupled to the frame and including a wheel hub and a rear axle substantially between the first rear wheel and the second rear wheel; wherein the drive system includes a system configured to rotate the first rear wheel and second rear wheel; and
   f) a locking device configured to lock the relative position of the wheel hub and the rear axle, wherein the locking device is selectably adjustably between a first mode and a second mode, wherein in the first mode the wheel hub and the rear axle are locked together, and wherein in the second mode the wheel hub and the rear axle are independently rotatable.

8. The tricycle of claim 7, further comprising a front suspension system functionally coupled between the frame and the front wheel.

9. The tricycle of claim 8, further comprising a rear suspension system functionally coupled between the frame and the first and second rear wheels.

10. The tricycle of claim 9, wherein the locking device further includes a locking pin configured to lock the wheel hub and the rear axle, thereby rotating the right rear wheel and the left rear wheel together.

11. The tricycle of claim 10, wherein the first rear wheel and the second rear wheel further include off road tires configured to provide traction for off road all-terrain use.

12. The tricycle of claim 11, wherein the front suspension system further includes a front fork shock suspension.

13. The tricycle of claim 12, wherein the rear suspension system further includes a suspension seat post coupled between the frame and the seat.

14. The tricycle of claim 13, wherein the transmission system of the drive system further includes gear ratios having a one to one gear ratio when in a second gear.

15. A tricycle, comprising:
   a) a frame;
   b) a front wheel coupled to the frame and including a front rim and a front tire coupled about the front rim;
   c) a first rear wheel coupled to the frame, wherein the first rear wheel includes a first rear rim and a first rear tire, wherein the first rear tire is wider than the front tire;
   d) a second rear wheel coupled to the frame, wherein the second rear wheel includes a second rear rim and a second rear tire, wherein the second rear tire is wider than the front tire; wherein the first rear wheel and the second rear wheel further include off road tires configured to provide traction for off road all-terrain use;
   e) a front suspension system functionally coupled between the frame and the front wheel; wherein the front suspension system further includes a front fork shock suspension;
   f) a rear suspension system functionally coupled between the frame and the first and second rear wheels; wherein the rear suspension system further includes a suspension seat post coupled between the frame and the seat;
   g) a drive system coupled to the frame and including a wheel hub and a rear axle substantially between the first rear wheel and the second rear wheel; wherein the drive system further includes a transmission system having gear ratios having a one to one gear ratio when in a second gear; and
   h) a locking device configured to lock the relative position of the wheel hub and the rear axle, wherein the locking device is selectably adjustably between a first mode and a second mode, wherein in the first mode the wheel hub and the rear axle are locked together, and wherein in the second mode the wheel hub and the rear axle are independently rotatable; wherein the locking device further includes a locking pin configured to lock the wheel hub and the rear axle.

\* \* \* \* \*